United States Patent [19]

Kono et al.

[11] Patent Number: 5,519,297
[45] Date of Patent: May 21, 1996

[54] SPINDLE POSITIONING METHOD

[75] Inventors: Shinichi Kono; Masaaki Fukukura, both of Oshino, Japan

[73] Assignee: Fanuc Ltd., Yamanashi, Japan

[21] Appl. No.: 133,127

[22] PCT Filed: Jan. 26, 1993

[86] PCT No.: PCT/JP93/00092

§ 371 Date: Oct. 13, 1993

§ 102(e) Date: Oct. 13, 1993

[87] PCT Pub. No.: WO93/15876

PCT Pub. Date: Aug. 19, 1993

[30] Foreign Application Priority Data

Feb. 14, 1992 [JP] Japan ................... 4-059114

[51] Int. Cl.⁶ ................... G05B 11/18
[52] U.S. Cl. ................... 318/594; 318/603; 318/461
[58] Field of Search ................... 318/590–593, 318/560–563, 569, 594, 600–603, 632, 445, 449, 456, 461–465

[56] References Cited

U.S. PATENT DOCUMENTS

| | | | |
|---|---|---|---|
| 4,170,865 | 12/1987 | Higomura | 318/594 X |
| 4,965,501 | 10/1990 | Hashimoto | 318/595 |
| 5,173,647 | 12/1992 | Hashimoto | 318/594 X |
| 5,194,788 | 3/1993 | Hashimoto | 318/594 X |

FOREIGN PATENT DOCUMENTS

| | | |
|---|---|---|
| 0150216 | 8/1985 | European Pat. Off. . |
| 55-154661 | 12/1980 | Japan . |
| 63-273114 | 11/1988 | Japan . |

OTHER PUBLICATIONS

EPS Search Report filed May 25, 1994.

*Primary Examiner*—David S. Martin
*Attorney, Agent, or Firm*—Staas & Halsey

[57] ABSTRACT

A spindle positioning method for high-speed positioning of a spindle by making the best use of the decelerating capability of a spindle motor. When a fixed-position stop command is generated while the operation of the spindle motor is controlled according to speed control, the motor rotation speed is reduced in accordance with the speed control to a speed N lower than or equal to a maximum rotational speed N1, which defines a constant torque region, and a control mode is switched from the speed control mode to position control mode at a point where the rotational speed is reduced to the speed N. Simultaneously, a value specifying the relation between the present position and target stop position of the motor with respect to one revolution of the spindle is set in an error counter as an initial position deviation. To carry out linear acceleration/deceleration control thereafter up to a final stop position, a position feedback quantity Pf is supplied from the position detector to the error counter, to obtain a speed command Vcmd, which is transferred to a speed loop process.

3 Claims, 3 Drawing Sheets

SPINDLE POSITIONING METHOD

BACKGROUND OF THE INVENTION

1. Field of the Invention

The present invention relates to a spindle positioning method for enabling a spindle motor to stop at a desired position stably in a shortest possible period of time, by making the best use of the decelerating capability of the spindle motor.

2. Description of the Related Art

In a known method for stopping a rotating spindle motor at a desired position, the motor is first decelerated to a base speed for positioning control during a speed control stage; then, a control mode for the spindle motor is switched from the speed control mode to a position control mode; and a position loop control is carried out using the difference between a commanded stop position and a current position as a position deviation.

In order to shorten the time required for the positioning in the known method, the value of position gain may be increased. If, however, the position gain is increased disregarding the accelerating/decelerating characteristics of the spindle motor, the spindle motor may fail to follow the speed command, causing an undesired overshoot. Conversely, if the value of the position gain during the position loop control is set too small for fear of the occurrence of overshoot, the time required for the positioning will inevitably be prolonged. Thus, it is difficult to prevent overshoot and achieve quick positioning at the same time.

SUMMARY OF THE INVENTION

An object of the present invention is to provide a spindle positioning method which is not only capable of preventing an undesired overshoot, but also capable of positioning a spindle of a machine tool at a desired stop position in a short time.

To achieve the above object, according to the present invention, when a fixed-position stop command is generated while operation of a spindle motor is controlled in accordance with speed control, the rotational speed of the spindle motor is reduced, according to the speed control, to a speed lower than or equal to a maximum rotational speed defining a constant torque region. A value specifying the relation between a present position and a commanded stop position of the spindle motor with respect to one revolution of the motor is set as an initial position deviation when the motor speed is reduced to the speed lower than or equal to a base speed, and an operation control mode for the motor is switched from the speed control mode to a position control mode. Linear acceleration/deceleration control is carried out thereafter until the commanded stop position is reached.

Further, the present invention provides a method of positioning a spindle at a desired rotational position, comprising the steps of: detecting the speed of a spindle motor and a rotational position of the spindle motor with respect to one revolution of the spindle when the speed of the spindle motor becomes lower than or equal to a base speed; obtaining a minimum amount of movement required if the spindle motor is decelerated along a deceleration line set based on the detected speed, as well as a distance from the detected rotational position to a target stop position; successively adding an amount of movement corresponding to one revolution of the spindle to the distance until the distance becomes greater than the minimum amount of movement and setting the obtained value as a position deviation; carrying out a position loop control, based on a speed command obtained, by multiplying the square root of the position deviation by a set position loop gain; and controlling operation of the spindle motor based on the speed command.

Preferably, the minimum amount of movement is obtained by dividing the square of the detected speed by a parameter value preset according to the deceleration line, and the position loop gain equals the square root of the parameter value.

Furthermore, the present invention provides a method comprising the steps of: (a) reducing the rotational speed of a spindle motor to a speed N, lower than or equal to a maximum rotational speed N1 which defines a constant torque region, when a fixed-position stop command is generated; (b) calculating a number of pulses P1 that a position detector will output when the spindle motor is decelerated from the rotational speed N at a predetermined gradient (deceleration) until a final stop position is reached; (c) calculating a number of pulses $\alpha$, which is required for the spindle to rotate in a forward direction from a present position to a commanded stop position within one revolution of the spindle; (d) comparing the number of pulses P1 calculated in the step (b) with the number of pulses $\alpha$ calculated in the step (c); (e) setting the number of pulses $\alpha$ in an error counter as an initial position deviation when the number of pulses $\alpha$ is greater than the number of pulses P1, or setting $\alpha+n \cdot Prev$ in the error counter as the initial position deviation when the number of pulses P1 is greater than or equal to the number of pulses $\alpha$, where Prev is a number of pulses that the position detector outputs during one revolution of the spindle, the value $\alpha+n \cdot Prev$ satisfying the relationship of $$\alpha+(n-1) \cdot Prev < P1 \leq \alpha+n \cdot Prev$$

where n is an integer greater than or equal to "1"; and (f) subtracting the number of feedback pulses Pf, output from the position detector, from the initial position deviation obtained in the step (c) to obtain a speed command by multiplying the square root of the obtained difference by a gain which is determined by a motor deceleration characteristic so that the operation of the spindle motor is controlled based on the speed command.

As described above, according to the present invention, when the rotating spindle is to be stopped at a predetermined position, the rotational speed of the spindle motor is first reduced to a speed region which is lower than or equal to the base speed and in which the torque is constant. Since in this region the torque is constant and thus linear acceleration/deceleration control is feasible, the spindle motor can be subjected to position control according to the predetermined deceleration line so as to be stopped at the final position. Thus, in the stage of deceleration before stoppage, the decelerating capability of the spindle motor is utilized most effectively, and the positioning time can be shortened without causing overshoot.

DETAILED DESCRIPTION OF PREFERRED EMBODIMENTS

Figure 1:
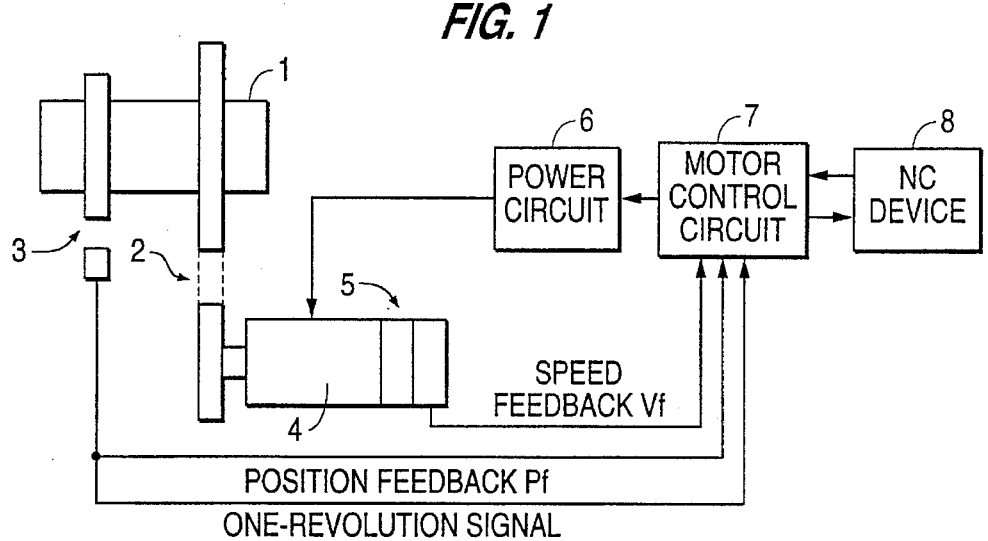
FIG. 1 is a block diagram showing a principal part of a spindle control circuit of a machine tool to which a method according to a preferred embodiment of the present invention is applied.

FIG. 1 is a block diagram showing a principal part of a spindle control circuit of a machine tool according to a preferred embodiment of the present invention. A spindle 1 is rotated by a spindle motor 4 via a power transmission mechanism 2 comprising gears, a timing belt, or the like. A position detector 3 is mounted on the spindle 1 for generating a given number, Prev, of position detection pulses per revolution and outputting a one-revolution signal per revolution. The spindle motor 4 for rotating the spindle 1 is mounted with a speed detector 5 for detecting the rotational speed of the motor 4.

The position detector 3 and the speed detector 5 are connected to a motor control circuit 7. The spindle motor 4 is connected to the motor control circuit 7 through a power circuit 6, while the motor control circuit 7 is connected to a numerical control (NC) device 8, which controls various axes of the machine tool. The motor control circuit 7 includes a speed control section for controlling the speed of the spindle motor 4, a position control section for controlling the stoppage and positioning of the motor 4, a processor for carrying out various calculations, a ROM, a RAM, etc., and controls the operation of the spindle motor 4 via the power circuit 6 such as a transistor inverter or the like.

The motor control circuit 7 further includes a counter for counting position feedback pulses Pf supplied from the position detector 3, and a latch circuit for latching the value of the counter each time it receives the one-revolution signal from the position detector 3.

The power transmission mechanism 2 of the embodiment has a reduction ratio of 1:1.

Figure 2:
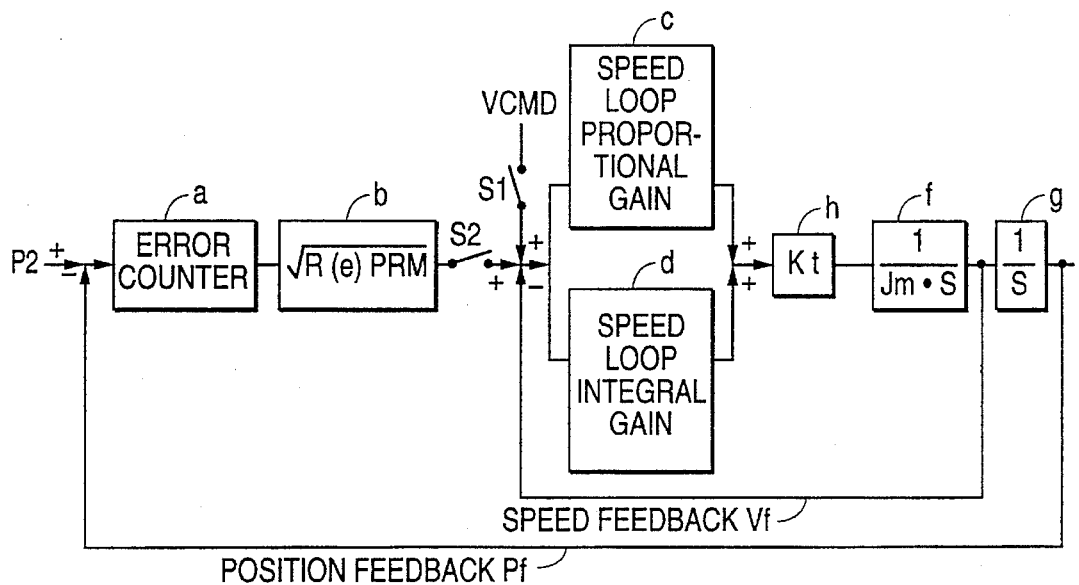
FIG. 2 is a functional block diagram showing details of a motor control circuit according to the preferred embodiment.

FIG. 2 is a functional block diagram of the motor control circuit 7. As seen in FIG. 2, the symbol "a" denotes an error counter for storing a position deviation at the time of motor stoppage and positioning; "b" denotes software means for executing a speed command calculation processing; and "c" and "d" denotes proportional and integral gains of a speed control loop, respectively. Symbols "h" and "f" each denote a term of a transfer function of the spindle motor 4, wherein Kt is a torque constant and Jm is inertia, and the symbol "g" denotes an integral term of the transfer function for integrating the speed to obtain the position. S1 and S2 are switches which are selectively operated depending on whether the control mode of the spindle 1 is for the speed control or for the positioning control.

First, the operation according to the preferred embodiment will be outlined. Normally, the switch S2 is opened while the switch S1 is closed, and speed control is carried out based on a rotational speed command Vcmd supplied from the numerical control device 8, as in a conventional system. Specifically, a speed feedback signal Vf output from the speed detector 5 is subtracted from the rotational speed command Vcmd to obtain a speed deviation, and the product of the speed deviation and the speed loop proportional gain "c" is added to the product of a value obtained by integrating the speed deviation and the speed loop integral gain "d" to obtain a torque command. Thus, the operation of the spindle motor 4 is controlled through the power circuit 6.

When a stop-and-position command and a spindle stop position (specific rotational position with respect to one revolution) are output from the numerical control device 8, the processor of the motor control circuit 7 starts a "fixed-position stop processing" (described in detail later with respect to the flowchart of FIG. 3), to control the operation of the spindle motor 4 while preventing overshoot and making the best use of the decelerating capability of the spindle motor 4, so that the spindle may be positioned at the specified stop position.

Figure 4:
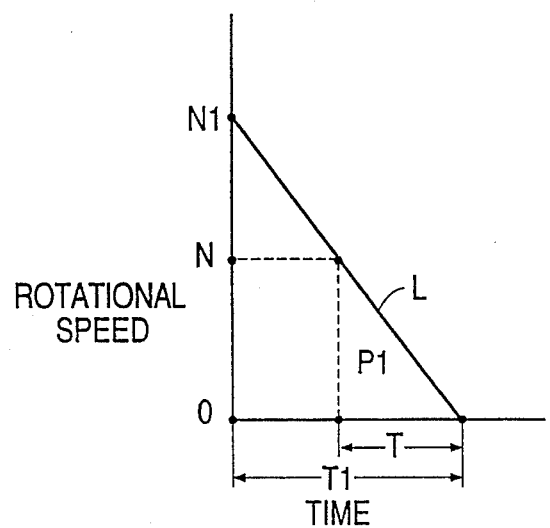
FIG. 4 is a diagram illustrating principles of a method for calculating a parameter used in the fixed-position stop processing; in accordance with the preferred embodiment of the invention

Referring now to FIG. 4 illustrating the principles underlying the invention, a method for obtaining a parameter will be described. Such parameter is required when carrying out fixed-position stop control while making the best use of the decelerating capability of the motor.

In a rotational region not higher than a certain rotational speed N1 (rpm), the spindle motor 4 produces a constant torque, and thus linear acceleration/deceleration control is feasible in this region. This rotational speed N1 (rpm), or a maximum 10 rotational speed per minute defining the constant torque region, is hereinafter referred to as the base speed N1. The linear acceleration/deceleration control is illustrated in the graph of FIG. 4, wherein the abscissa represents time; the ordinate represents, rotational speed; and a straight line L (deceleration line) in the figure indicates a decelerating action.

In FIG. 4, when a stopping time required to bring the spindle motor 4 rotating at the base speed N1 to a stop by a maximum decelerating action is T1, and a time required to bring the spindle motor 4 rotating at an arbitrary rotational speed N (rpm) lower than the base speed N1 to a stop along the deceleration line L is T, the following relationship is fulfilled, since the gradient (deceleration) of the deceleration line L is fixed:

$$T = \frac{T1}{N1} \cdot N \tag{1}$$

Then, assuming that the number of the position feedback pulses output from the position detector 3 during one revolution of the spindle 1 is Prev (pulses), P1, a number of pulses to be generated by the position detector 3 from the time the spindle motor 4 starts decelerating from an arbitrary rotational speed N, lower than or equal to the base speed N1, along the deceleration line L until the motor is rotated to a commanded stop position is calculated. Since the area of a small triangle defined by the vertical dashed line, the deceleration line L, and the time axis (axis of abscissas) in FIG. 4 is equivalent to the number of revolutions which the spindle makes until it stops, P1, the number of pulses is given by the following equation:

$$P1 = \frac{1}{2} \cdot T \cdot \frac{N}{60} \cdot \text{Prev} \tag{2}$$

From equations (1) and (2), the following equation is derived:

$$P1 = \frac{\text{Prev}}{120} \cdot \frac{T1}{N1} \cdot N^2 \tag{3}$$

Solving equation (3) for the rotational speed N provides the following equation:

$$N = \sqrt{\frac{120}{Prev} \cdot \frac{N1}{T1} \cdot P1} \qquad (4)$$

Provided the motor output torque, motor inertia and load inertia in the constant torque region are Tm, Jm, and JL, respectively, the following equation holds true based on the general formula related to torque and acceleration:

$$T1 = \frac{Jm + JL}{Tm} \cdot \frac{2\pi}{60} \cdot N1 \qquad (5)$$

From the above equation (5), equation (6) is derived.

$$\frac{N1}{T1} = \frac{Tm}{Jm + JL} \cdot \frac{60}{2\pi} \qquad (6)$$

Substituting the left side of equation (6) into the right side of equation (4) provides $$N = \sqrt{\frac{120}{Prev} \cdot \frac{Tm}{Jm + JL} \cdot \frac{60}{2\pi} \cdot P1} \qquad (7)$$

In the above equation (7), since the motor output torque Tm, the motor inertia Jm, the load inertia JL, and the number Prev of pulses per revolution of the spindle 1 are known, part of equation (7) can be used as a parameter according to the motor characteristic, and expressed as follows:

$$\sqrt{PRM} = \sqrt{\frac{120}{Prev} \cdot \frac{Tm}{Jm + JL} \cdot \frac{60}{2\pi}} \qquad (8)$$

The value of the parameter PRM in equation (8) is written in advance in the ROM of the motor control circuit 7.

Based on equation (8), equation (7) can be expressed as follows:

$$N = \sqrt{P1} \cdot \sqrt{PRM} \qquad (9)$$

Equation (9) indicates that, when the present speed is N, the most efficient deceleration till stoppage can be implemented by carrying out a position loop control, wherein a position command of pulses P1 is given as an initial value of position deviation; a position deviation is obtained by subtracting the position feedback pulse Pf from the position deviation, and a speed command is calculated by multiplying the square root of the position deviation by the square root of the parameter PRM as the position loop gain. That is, the spindle motor 4 is decelerated and stopped along the deceleration line L shown in FIG. 4.

Solving equation (9) for P1, the number of pulses, corresponding to the distance moved before the stoppage, provides the following equation:

$$P1 = N \cdot N / PRM \qquad (10)$$

Equation (10) indicates that, when the rotational speed of the spindle motor 4 is N, the initial value of position deviation equals P1, the number of pulses, calculated by equation (10).

Thus, in order to stop the spindle 1 in short time by making the best use of the decelerating capability of the spindle motor 4, the rotational speed of the spindle motor 4 is first reduced to a rotational speed N lower than or equal to the base speed N1, and the position loop control is carried out using P1, the number of pulses calculated by equation (10) as the initial value of position deviation, whereby the spindle 1 can be stopped at the position specified by P1, the number of pulses in the shortest time.

When the spindle motor 4 has to be stopped by the stop-and-position command, a predetermined position within one revolution of the spindle 1 is specified as a target position. Specifically, the target position is previously specified as a rotational position, which corresponds to a predetermined number of position detection pulses (P2 pulses), from the time of generation of the one-revolution signal.

Figure 5A:
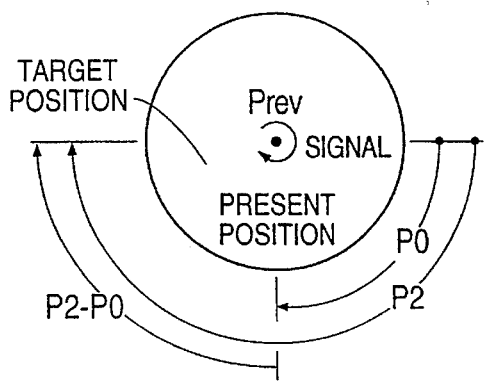
FIGS. 5(a) and 5(b) are conceptual diagrams illustrating the relationship between current position of a spindle motor and commanded stop position of a spindle.
Figure 5B:
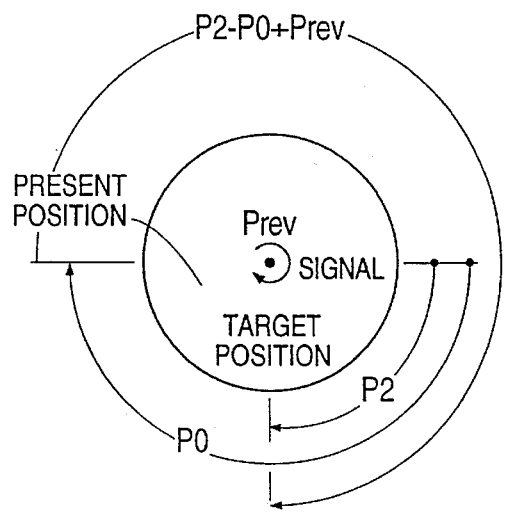

As shown in FIGS. 5(a) and 5(b), let us consider the case where the spindle is currently at a rotational position ("present position"), and P0 position detection pulses have been generated from the time of output ("signal") of the one-revolution signal until the time at which the spindle reaches the present position. In order for the spindle to rotate in a forward direction (clockwise in the example shown in FIGS. 5(a) and 5(b)) and stop at a position (target position) coinciding with a position which is within one revolution from the current position, the amount of rotation of the spindle can be expressed in terms of a number of position detection pulses $\alpha$ (<Prev), as follows:

When P2≧P0 as shown in FIG. 5(a), $\alpha$=P2−P0; and when P2<P0 as shown in FIG. 5(b), $\alpha$=P2−P0+Prev.

After performing the calculation shown in equation (10) based on the rotational speed N to obtain P1, the number of pulses corresponding to the difference between the current position and the stop position, if it is found that the obtained value P1 is smaller than the value $\alpha$ (P1<$\alpha$), this means that the present speed N is lower than a speed for enabling the spindle to cover the distance equivalent to the pulses $\alpha$ in the shortest time. In this case, the number of pulses $\alpha$, not P1, the number of pulses, is set in the error counter as the initial value of position deviation. Then, the feedback pulse Pf delivered from the position detector is subtracted from the initial position deviation $\alpha$; the square root of the resulting value is multiplied by a coefficient determined by the motor deceleration characteristic to obtain a speed command (see equation (9) above); and the position loop control is carried out (the switch S1 is OFF, while switch S2 is ON as shown in FIG. 2). As a result, the speed rises once above the present speed; however, still it is possible to position the spindle in the shortest time along the deceleration line L.

When P1, the number of pulses corresponding to the difference between the current position and the stop position is greater than or equal to the value $\alpha$ (P1≧$\alpha$), "$\alpha$+n·Prev", where n is an integer greater than or equal to "1" and satisfies the relationship:

$$\alpha + (n-1) \cdot Prev < P1 \leq \alpha + n \cdot Prev \qquad (11),$$

is set as an initial value $\alpha'$ of position deviation. Then, the feedback pulse Pf delivered from the position detector is subtracted from the initial position deviation $\alpha'$; the square root of the resulting value is multiplied by the coefficient determined by the motor deceleration characteristic to obtain a speed command (see equation (9) above); and the position loop control is carried out (switch S1 is OFF, while switch S2 is ON as shown in FIG. 2). Since the value $\alpha'$ set as the initial value is equal to or slightly greater than P1, the speed may, in some cases, rise once somewhat above the present speed, but is thereafter immediately slowed down along the deceleration line L, and the spindle reaches the final stop position in accordance with the deceleration line L in the shortest time without causing overshoot.

Figure 3:
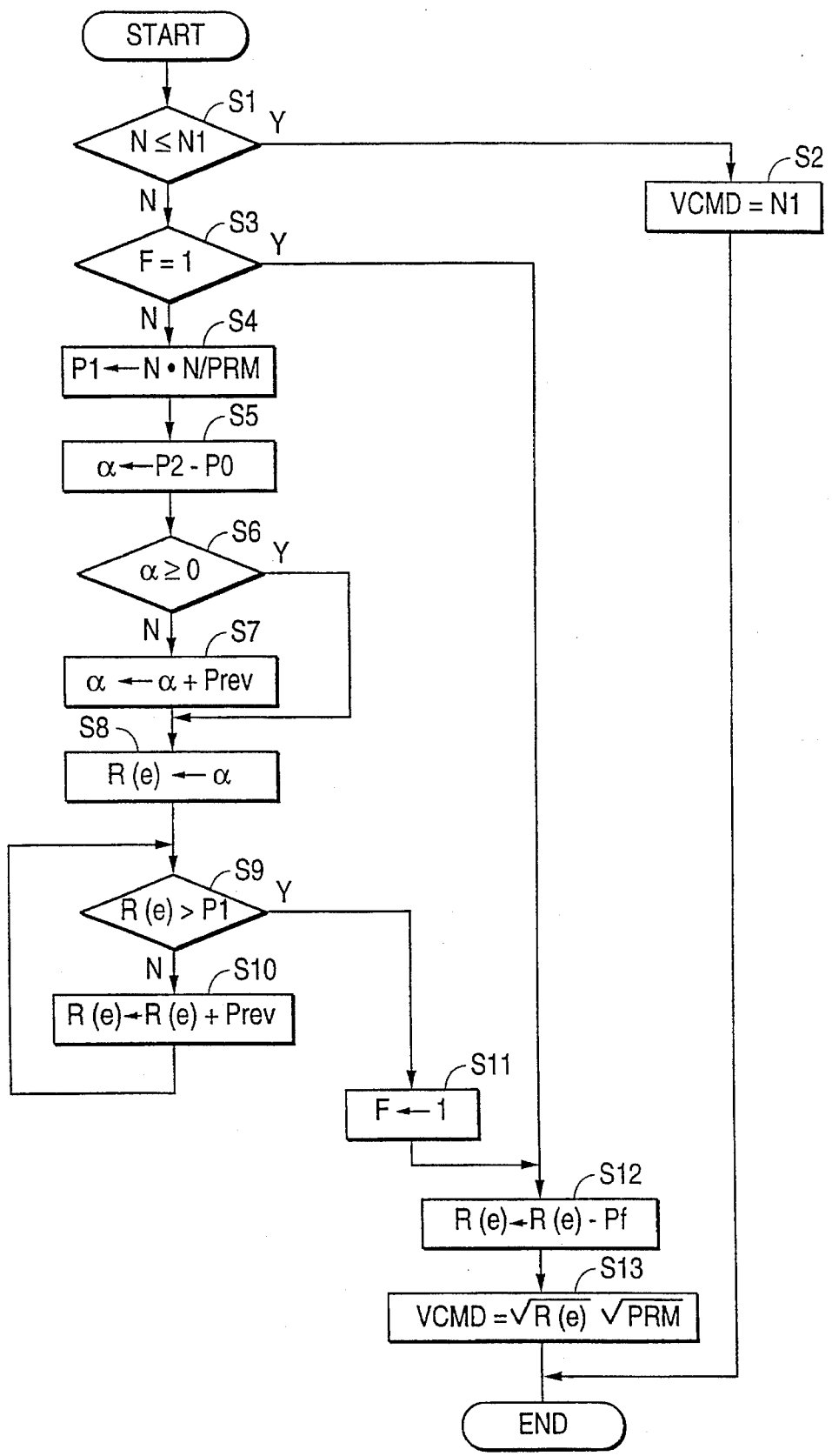
FIG. 3 is a flowchart illustrating an outline of a fixed-position stop processing to be executed by the motor control circuit according to the preferred embodiment.

FIG. 3 is a flowchart showing an outline of the "fixed-position stop processing" employed according to the preferred embodiment to carry out the above-described control method. In the following, a spindle positioning method of the preferred embodiment will be described with reference to the flowchart.

Upon receiving the stop-and-position command from the numerical control device 8 and a stop position signal, which is given as the number of pulses P2 after generation of a one-revolution signal, the processor of the motor control circuit 7 executes the processing shown in the flowchart of FIG. 3 with every predetermined period.

First, it is determined whether the present speed N of the spindle motor 4 is within a rotational speed region which is lower than or equal to the base speed N1 (Step S1). If the rotational speed N of the spindle motor 4 is not lower than or equal to the base speed N1, the base speed N1 is thereafter outputted as the rotational speed command Vcmd with every predetermined period until the rotational speed N becomes lower than or equal to the base speed N1 (Step S2), thereby slowing down the rotational speed N of the spindle motor 4 to a level lower than or equal to the base speed N1. Specifically, when the switch S2 (FIG. 2) is turned off while the switch S1 (FIG. 2) turned on, the base speed N1 is continuously output as the rotational speed command Vcmd.

If it is concluded thereafter in Step S1 that the present rotational speed N has become lower than or equal to the base speed N1, the processor of the motor control circuit 7 determines whether a distance setting completion flag F is set (Step S3). At this stage, since the distance setting completion flag F remains reset because of initialization, the calculation of equation (10) is performed, using the value of the present rotational speed N, to obtain a number of pulses P1, which corresponds to the distance over which the spindle motor 4 will rotate before being stopped when the spindle motor 4 is decelerated along the deceleration line L, and the obtained data P1 is stored in register (Step S4).

Subsequently, the processor of the motor control circuit 7 subtracts the value of the counter at the time of detection of the one-revolution signal, latched in the latch circuit, from the value of the counter for counting the position feedback pulses to obtain the rotational position P0 of the spindle starting from the position of detection of the one-revolution signal, and also subtracts the present position P0 from the stop position P2 falling within one revolution of the spindle to obtain a number of pulses α (=P2−P0) equivalent to the distance between the present position and the stop position (Step S5). If the value α is "0" or a positive value, it is stored in a position deviation register R(e) as an initial value; if the value α is negative, the sum of the value α and the number of pulses Prev corresponding to one revolution of the spindle is stored in the position deviation register R(e) as the initial value (Steps S6 to S8). If the number of pulses α (=P2−P0) obtained in Step S5 is positive, this indicates the presence of a state in which the present position P0 is before the stop position P2 when considered on the basis of a one-revolution range starting from generation of the one-revolution signal, as shown in FIG. 5(a). On the other hand, when the present position P0 of the spindle motor 4 is past the stop position P2, as shown in FIG. 5(b), that is, if P0>P2 and α<0 (Step S6), the number of pulses Prev corresponding to one revolution of the spindle 1 is further added to α (=P2−P0), and the value obtained or [P2−P0+Prev=α+Prev] is stored in the position deviation register R(e) as the initial value of position deviation.

The processor then compares the obtained number of pulses P1 obtained in Step S4 with the value α stored in the position deviation register R(e), i.e., the number of pulses α corresponding to the distance to the stop position P2. If the value stored in the register R(e) is smaller than or equal to the obtained number of pulses P1 (Step S9), the sum of the value α stored in the register R(e) and the number of pulses Prey corresponding to one revolution of the spindle is stored in the register R(e) as a new value (Step S10), and the flow returns to Step S9 wherein the new value α stored in the position deviation register R(e) is compared with the number of pulses P1. As Steps S9 and S10 are repeated in this manner, the value stored in the register R(e) gradually increases. When the value stored in the register R(e) has become greater than the number of pulses P1, that is, an integer n satisfying equation (11) is found, the flag F is set (Step S11), and the position loop control is initiated. Specifically, the switch S1 in FIG. 2 is turned off, and the switch S2 is turned on. Then, the position feedback quantity Pf of the present cycle is subtracted from the position deviation e, which is stored in the position deviation register R(e) as the initial value, to obtain a new position deviation e which is then stored in the register R(e) (Step S12), and the square root of the position deviation e, stored in the register R(e) is multiplied by the square root of the parameter PRM to obtain a speed command Vcmd (Step S13). The obtained speed command is transferred to the speed loop process and the processing of the present cycle is ended.

In the subsequent and succeeding cycles, Steps S1, S3, S12 and S13 are repeatedly executed to carry out the position loop process, since the distance setting completion flag F is set. When the value stored in the position deviation register R(e) becomes "0", that is, when the position deviation becomes "0", the speed command also becomes "0" and the spindle 1 will be stopped.

The above-described preferred embodiment is concerned with the case wherein the reduction ratio of the power transmission mechanism 2 is 1:1 (as in the case where the spindle 1 is directly coupled to the spindle motor 4), but the spindle positioning method of this embodiment can be applied to a system having a different reduction ratio, by appropriately correcting the various equations mentioned above.

We claim:

1. A spindle positioning method for positioning a spindle driven by a spindle motor at a desired rotational position, comprising the steps of:

detecting when a speed of the spindle motor is no more than a base speed, the base speed being a maximum rotational speed defining a constant torque region of operation for the spindle motor;

detecting a rotational position of the spindle motor with respect to one revolution of the spindle when the speed of the spindle motor is detected as no more than the base speed;

determining a minimum amount of rotational movement of the spindle required to position the spindle at the desired rotational position if the spindle motor is decelerated according to a spindle motor deceleration characteristic based on the detected speed;

determining a rotational distance from the detected rotational position to a target stop position;

successively adding a rotational distance corresponding to one revolution of the spindle to said rotational distance from the detected rotational position to the target stop position until a result of the successive addition becomes greater than the minimum amount of rotational movement;

setting, as a position deviation, the value obtained by successively adding said rotational distance corresponding to one revolution of the spindle to said rotational distance from the detected rotational position to the target stop position;

performing position loop control based on a speed command obtained by multiplying the square root of the position deviation by a set position loop gain; and controlling operation of the spindle motor based on the speed command.

2. The method according to claim 1, wherein said minimum amount of rotational movement is determined by dividing the square of the detected speed by a parameter value preset according to the spindle motor deceleration characteristic, and the position loop gain equals the square root of the parameter value.

3. A spindle positioning method for controlling a spindle driven by a spindle motor, comprising the steps of:

(a) reducing a rotational speed of the spindle motor to a speed N, which is not more than a maximum rotational speed defining a constant torque region of operation for the spindle motor;

(b) generating a fixed-position stop command;

(c) calculating a number of pulses P1 that a position detector will output when the spindle motor is decelerated from the rotational speed N at a predetermined deceleration until a final stop position;

(d) calculating a number of pulses $\alpha$ that the position detector will output while the spindle rotates from a present position to a commanded stop position which is within one revolution of the spindle;

(e) comparing the number of pulses P1 calculated in said step (c) with the number of pulses $\alpha$ calculated in said step (d);

(f) setting the number of pulses $\alpha$ in an error counter as an initial position deviation when the number of pulses $\alpha$ is greater than the number of pulses P1;

(g) setting $\alpha+n\cdot Prev$ in the error counter as the initial position deviation when the number of pulses P1 is greater than or equal to the number of pulses $\alpha$, where Prev is a number of pulses that the position detector outputs during one revolution of the spindle, said $\alpha+n\cdot Prev$ satisfying the relationship of $$\alpha+(n-1)\cdot Prev < P1 \leq \alpha+n\cdot Prev$$

where is an integer greater than or equal to "1"; and (h) subtracting a number of feedback pulses Pf, output from the position detector, from the initial position deviation obtained in said step (f) to obtain a speed command by multiplying the square root of the obtained difference by a gain which is determined by a motor deceleration characteristic so that operation of the spindle motor is controlled based on the speed command.

* * * * *